US012223500B2

(12) United States Patent
Babar et al.

(10) Patent No.: US 12,223,500 B2
(45) Date of Patent: Feb. 11, 2025

(54) TRANSACTION ACCOUNT DATA MAINTENANCE USING BLOCKCHAIN

(71) Applicant: American Express Travel Related Services Company, Inc., New York, NY (US)

(72) Inventors: Faraz Babar, Paradise Valley, AZ (US); Aimee Cardwell, Plymouth, MA (US); Andras L. Ferenczi, Peoria, AZ (US); Dallas Gale, Scottsdale, AZ (US); Nilesh Yashavant Jadhav, Phoenix, AZ (US); Ashish Kumar, Bangalore (IN); Harish R. Naik, Phoenix, AZ (US); Lavanya Venkatanarayanan, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 237 days.

(21) Appl. No.: 17/667,806

(22) Filed: Feb. 9, 2022

(65) Prior Publication Data

US 2022/0270089 A1    Aug. 25, 2022

Related U.S. Application Data

(63) Continuation of application No. 16/220,235, filed on Dec. 14, 2018, now Pat. No. 11,282,076.

(51) Int. Cl.
*G06Q 20/38* (2012.01)
*G06Q 20/40* (2012.01)
*H04L 9/06* (2006.01)

(52) U.S. Cl.
CPC ....... *G06Q 20/3827* (2013.01); *G06Q 20/401* (2013.01); *G06Q 20/405* (2013.01); *H04L 9/0637* (2013.01)

(58) Field of Classification Search
CPC . G06Q 20/3827; G06Q 20/401; G06Q 20/405
See application file for complete search history.

(56) References Cited

U.S. PATENT DOCUMENTS 6,658,568 B1 * 12/2003 Ginter ............... G06T 1/0021
   380/231
8,706,622 B2    4/2014 Winters et al.
(Continued)

FOREIGN PATENT DOCUMENTS

JP    2007-518150 A    7/2007

OTHER PUBLICATIONS

S. Amofa et al., "A Blockchain-based Architecture Framework for Secure Sharing of Personal Health Data, " 2018 IEEE 20th International Conference on e-Health Networking, Applications and Services (Healthcom), Ostrava, Czech Republic, 2018, pp. 1-6, doi: 10.1109/HealthCom.2018.8531160. keywords: {Information exchang.*
(Continued)

*Primary Examiner* — Steven S Kim
(74) *Attorney, Agent, or Firm* — Thomas | Horstemeyer, LLP

(57) ABSTRACT

Systems and methods for the maintenance of merchant-stored transaction account data are disclosed. The system may include various merchant systems and issuer systems in communication via a blockchain network. The system provides a process for collaboration between various issuer systems and merchant systems to update and maintain merchant stored transaction account data in response to changes, cancellations, updates, or the like in various stored transaction account.

20 Claims, 4 Drawing Sheets

(56) References Cited

U.S. PATENT DOCUMENTS

| | | | |
|---|---|---|---|
| 9,940,089 B2 | 4/2018 | Borse | |
| 9,947,007 B2 | 4/2018 | Greenbaum et al. | |
| 10,268,643 B2 | 4/2019 | Kraljevic et al. | |
| 10,475,035 B2 | 11/2019 | Xu et al. | |
| 10,705,926 B2 | 7/2020 | Thakur et al. | |
| 10,909,513 B2 | 2/2021 | Rosano et al. | |
| 10,984,414 B1 | 4/2021 | Wilson et al. | |
| 11,900,339 B1* | 2/2024 | Vijayaraghavan | G06Q 20/10 |
| 2004/0143527 A1 | 7/2004 | Benkert et al. | |
| 2009/0173783 A1 | 7/2009 | Fomitchev | |
| 2010/0036769 A1 | 2/2010 | Winters et al. | |
| 2013/0073460 A1* | 3/2013 | Paquin | G06F 21/6263 |
| | | | 705/44 |
| 2013/0117087 A1 | 5/2013 | Coppinger | |
| 2015/0026049 A1 | 1/2015 | Theurer et al. | |
| 2015/0220914 A1 | 8/2015 | Purves et al. | |
| 2016/0065616 A1 | 3/2016 | Srikanth et al. | |
| 2016/0292680 A1 | 10/2016 | Wilson, Jr. et al. | |
| 2016/0342978 A1 | 11/2016 | Davis et al. | |
| 2016/0342989 A1 | 11/2016 | Davis | |
| 2016/0342994 A1* | 11/2016 | Davis | G06Q 20/0655 |
| 2016/0345978 A1 | 12/2016 | Cruise et al. | |
| 2017/0048209 A1 | 2/2017 | Lohe et al. | |
| 2017/0091740 A1 | 3/2017 | Enomoto et al. | |
| 2017/0109735 A1 | 4/2017 | Sheng et al. | |
| 2017/0132626 A1* | 5/2017 | Kennedy | G06Q 20/065 |
| 2017/0230189 A1 | 8/2017 | Toll et al. | |
| 2017/0232300 A1 | 8/2017 | Tran et al. | |
| 2017/0372300 A1 | 12/2017 | Dunlevy et al. | |
| 2018/0006826 A1 | 1/2018 | Smith et al. | |
| 2018/0075453 A1 | 3/2018 | Durvasula et al. | |
| 2018/0109508 A1 | 4/2018 | Wall et al. | |
| 2018/0174145 A1 | 6/2018 | Groarke et al. | |
| 2018/0189753 A1 | 7/2018 | Konda et al. | |
| 2018/0191503 A1 | 7/2018 | Alwar et al. | |
| 2018/0268401 A1* | 9/2018 | Ortiz | G06Q 20/326 |
| 2018/0315046 A1* | 11/2018 | Joao | G06Q 20/322 |
| 2018/0349621 A1 | 12/2018 | Schvey et al. | |
| 2019/0004789 A1* | 1/2019 | Mills | H04L 9/3239 |
| 2019/0012695 A1* | 1/2019 | Bishnoi | G06Q 20/223 |
| 2019/0044917 A1* | 2/2019 | Mork | H04L 63/0428 |
| 2019/0180275 A1* | 6/2019 | Safak | G06Q 20/385 |
| 2019/0188719 A1 | 6/2019 | Das et al. | |
| 2019/0205871 A1 | 7/2019 | Vernon et al. | |
| 2019/0305964 A1* | 10/2019 | Hamel | H04L 9/0891 |
| 2020/0193429 A1 | 6/2020 | Babar et al. | |
| 2021/0201315 A1* | 7/2021 | Alt | G06Q 20/4014 |
| 2022/0277276 A1* | 9/2022 | Madhavan | G06F 16/22 |

OTHER PUBLICATIONS

International Search Report and Written Opinion PCT Serial No. PCTIUS2018/059670 dated Jan. 25, 2019.
Non-Final Office Action dated May 13, 2019 in U.S. Appl. No. 15/266,350.
Waraporn et al (Virtual Credit Cards on Mobile for M-Commerce Payment ) (Year: 2009).
International Search Report Mailed Feb. 28, 2020.
Final Office Action dated Sep. 11, 2019 in U.S. Appl. No. 15/266,350.
International Search Report and Written Opinion PCT Serial No. PCTiUS2019/022791 dated Jun. 6, 2019.
Restriction Office Action dated Aug. 6, 2019 in U.S. Appl. No. 15/1405,123.
Korean Office Action in related, co-pending Korean Application No. 2021-7017463 mailed Mar. 20, 2023 (English Translation also provided).

* cited by examiner

TRANSACTION ACCOUNT DATA MAINTENANCE USING BLOCKCHAIN

CROSS REFERENCE TO RELATED APPLICATIONS

This application is a continuation application of U.S. patent application Ser. No. 16/220,235, filed on Dec. 14, 2018, entitled "Transaction Account Data maintenance using Blockchain", which is incorporated herein by reference.

FIELD

The disclosure generally relates to transaction account data stored by merchants, and more specifically, to systems and methods for the maintenance of merchant-stored transaction account data using blockchain.

BACKGROUND

Users may desire to register with a merchant such as, for example, by creating a user credential (e.g., username, password, biometric input, etc.), inputting user data (e.g., name, address, email address, phone number, etc.), inputting transaction account data (e.g., transaction account number, billing address, expiration date, security code, etc.), and the like. The merchant may store the transaction account data to enable the user to purchase and return goods or services without needing to continually re-enter the data. In response to the user initiating a purchase, the merchant may transmit the stored transaction account data to an issuer to authorize the transaction.

However, the stored transaction account data may become out of date. For example, the transaction account may expire or become compromised (e.g., due to theft), and a new transaction account number, expiration date, security code, or the like, may be issued to the user. Typically, merchants may update the stored transaction account data by transmitting lists of stored transaction account numbers to each corresponding issuer and receiving back the updated transaction account data from each issuer. The stored transaction account data may not be updated in real-time, and each issuer may have separate and custom processes for transmitting the stored transaction account data to be updated. A technical problem is that the typical process for updating merchant-stored transaction account data may be time consuming and may cause undue processing and resource consumption by both the merchant and the various issuers.

SUMMARY

Systems, methods, and articles of manufacture (collectively, the "system") for the maintenance of merchant-stored transaction account data are disclosed. The system may generate an account hash comprising a cryptographic hash of at least one data element from a merchant-stored transaction account data. The system may invoke a maintenance smart contract by passing the account hash and at least one data element from the merchant-stored transaction account data. In response to being invoked, the maintenance smart contract may be configured to determine whether the account hash matches a stored primary account hash or a stored past account hash. In response to determining that the account hash matches the stored past account hash, the maintenance smart contract may be configured to return an associated primary account hash to the processor. The system may transmit the associated primary account hash and the account hash to an issuer system. In response to receiving the associated primary account hash and the account hash the issuer system may be configured to determine an updated transaction account data based on the associated primary account hash. The system may receive the updated transaction account data from the issuer system and update the merchant-stored transaction account data based on the updated transaction account data.

In various embodiments, the system may generate the account hash in response to receiving a transaction request, and wherein in response to receiving the updated transaction account data from the issuer system, the system is configured to authorize the transaction request. The merchant-stored transaction account data may comprise a user first name, a user last name, an issuer identifier, a transaction account number, a transaction account address, a transaction account security code, and/or a transaction account expiration date.

In various embodiments, the system may receive an account on file request comprising the merchant-stored transaction account data. The system may generate a stored account hash comprising a cryptographic hash of at least one data element from the merchant-stored transaction account data. The system may invoke the maintenance smart contract by passing the stored account hash and at least one data element from the merchant-stored transaction account data. In response to being invoked, the maintenance smart contract may be configured to write the stored account hash and the at least one data element from the merchant-stored transaction account data to a maintained accounts blockchain. In response to writing to the maintained accounts blockchain, the maintenance smart contract may be configured to notify the issuer system of the write. The issuer system may be configured to validate the write to the maintained accounts blockchain by determining whether the stored account hash and the at least one data element from the merchant-stored transaction account are up to date.

In various embodiments, the issuer system may be configured to generate an issuer account hash in response to receiving a transaction account update request. The issuer account has may comprise a cryptographic hash of at least one data element from an issuer-stored transaction account data. The issuer system may be configured to invoke the maintenance smart contract by passing the issuer account hash and at least one data element from the issuer-stored transaction account data. In response to being invoked, the maintenance smart contract may be configured to write the issuer account hash and the at least one data element from the issuer-stored transaction account data to the maintained accounts blockchain. The system may retrieve the issuer account hash and the at least one data element from the issuer-stored transaction account data from the maintained accounts blockchain. The system may update the merchant-stored transaction account data based on the issuer-stored transaction account data.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
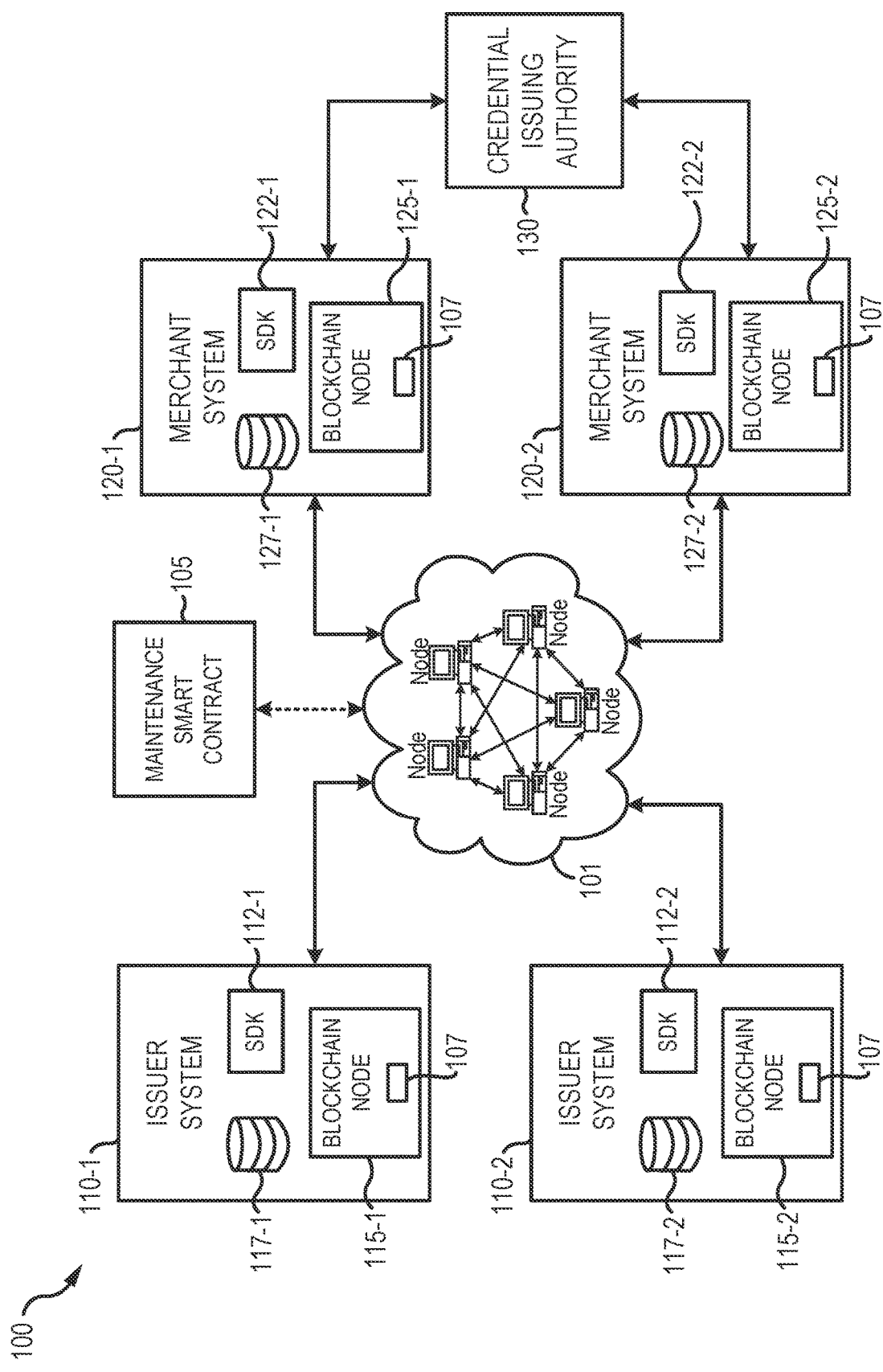
FIG. 1 is a block diagram illustrating various system components of a system for maintenance of stored transaction account data, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In various embodiments, the systems for the maintenance of merchant-stored transaction account data are disclosed. The system may provide an efficient process for collaboration between various issuer systems and merchant systems to update and maintain merchant-stored transaction account data, including changes to transaction account numbers, expiration dates, security codes (e.g., a card security code (CSC), card verification value (CVV), etc.), and the like, as well as cancellation notifications. Instead of typical systems wherein each merchant system may need to communicate separately with each issuer system, the system enables merchant systems to retrieve updated transaction account data from all (or any subset of) issuer systems at substantially the same time. In various embodiments, the system may also scale to accommodate any desired number of issuer systems and/or merchant systems.

In various embodiments, the system may use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER®. Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of buying requests and purchases by performing cryptographic processes on data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. Further, by syncing data with the involved parties in real time (or near real time), the system may improve data integrity, data confidentiality, and data security, which may also improve the speed of the business process. The system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, and U.S. application Ser. No. 16/012,598 titled BUYER-CENTRIC MARKETPLACE USING BLOCKCHAIN and filed on Jun. 19, 2018, the contents of which are each incorporated by reference in its entirety.

This system further improves the functioning of the computer and network. For example, by transmitting, storing, and accessing data using the processes described herein, the security of the data is improved, which decreases the risk of the computer or network from being compromised. As a further example, and as discussed further herein, by transmitting cryptographic hashes of the transaction account data instead of the full account data, the privacy and security of the transaction account data may be improved. Moreover, the cryptographic hashes may be generated using multi-party or two-party computation methods to further improve the integrity of the cryptographic hash and to at least partially prevent brute force and/or rainbow table attacks. In various embodiments, the collaborative nature of the system may also decrease the amount of data transmitted over the network by limiting requests to scenarios where merchants do not have the latest information for a given transaction account.

In various embodiments, and with reference to FIG. 1, a system 100 for maintenance of merchant-stored transaction account data is disclosed. System 100 may include various computing devices, software modules, networks, and data structures in communication with one another. System 100 may contemplate uses in association with web services, utility computing, pervasive and individualized computing, security and identity solutions, autonomic computing, cloud computing, commodity computing, mobility and wireless solutions, open source, biometrics, grid computing, and/or mesh computing. System 100 implementing a blockchain technology, as described herein, may simplify and automate maintenance of merchant-stored transaction data and related processes by using the blockchain as a distributed and tamper-proof data store. Transparency is very high for various embodiments using a federated or public blockchain since validation is performed, for example, using data stored by a decentralized autonomous organization (DAO) instead of a specific financial institution.

In various embodiments, system 100 may comprise one or more issuer systems 110 and merchant systems 120 in communication via a blockchain network 101. Blockchain network 101 may be in electronic communication with each issuer system 110 and/or merchant system 120 via one or more blockchain nodes, as discussed further herein. Blockchain network 101 may be a blockchain network or peer-to-peer network that is private, consortium and/or public in nature (e.g., ETHEREUM®, HYPERLEDGER® Fabric, etc.). Consortium and private networks may offer improved control over the content of the blockchain and public networks may leverage the cumulative computing power of the network to improve security. The blockchain network 101 may comprise various blockchain nodes in electronic communication with each other, as discussed further herein.

In various embodiments, blockchain network 101 may host and/or implement one or more smart contracts. The smart contracts may control the end-to-end data flow in system 100 and may autonomously govern the maintenance process by supporting execution and recording of various transaction data, as discussed further herein. For example, and in accordance with various embodiments, blockchain network 101 may host one or more maintenance smart contracts 105. In various embodiments, blockchain network 101 may also host one or more issuer-specific and/or merchant-specific smart contracts (e.g., private smart contracts). Each smart contract in blockchain network 101 may comprise executables that write data to maintained accounts blockchain 107 in a predetermined format based on predetermined function parameters passed by an API call or the like, or transmit data to one or more systems or parties in system 100, as discussed further herein. Each smart contract may include a program written in a programming language such as, for example, Solidity, or any other suitable smart contract programming language.

In various embodiments, maintenance smart contract 105 may be configured to be invoked by one or more issuer systems 110 and/or merchant systems 120 to perform various operations disclosed herein. For example, maintenance smart contract 105 may be configured to control the maintenance workflow, write data to maintained accounts blockchain 107, retrieve data from maintained accounts blockchain 107, transmit notifications to one or more entities, and/or the like, as discussed further herein.

In various embodiments, each private smart contract may be configured to enable private communications between a specific merchant and a specific issuer system. For example, a merchant may invoke a private smart contract to privately transmit data or requests for data to an issuer system, as discussed further herein. As a further example, the issuer system may invoke the private smart contract to privately return data to the merchant, as discussed further herein. In that respect, the private smart contracts may function similar to an API call, and may enable private communications and transfers of sensitive data between specific issuer systems and merchants.

In various embodiments, maintenance smart contract 105 and/or one or more participants in blockchain network 101 (e.g. blockchain nodes) may store and maintain a blockchain state repository. The blockchain state repository may comprise local copies of the state of blockchain network 101, including up-to-date data from maintained accounts blockchain 107 based on the most recent transactions in blockchain network 101 (e.g., the world state). For example, and in accordance with various embodiments, the blockchain state repository may comprise account hashes, issuer identifiers, transaction account data, and the like. The data may be grouped by issuer identifier.

In various embodiments, system 100 may comprise one or more issuer systems 110. For example, system 100 may comprise a first issuer system 110-1, a second issuer system 110-2, and/or any other number of issuer systems (collectively, issuer systems 110). Phrases and terms similar to "issuer system," "transaction account issuer," "financial institution," or the like may include any entity that offers transaction account services. Although often referred to as a "financial institution," one or more issuer systems 110 may represent any type of bank, lender, or other type of account issuing institution, such as credit card companies, card sponsoring companies, or third-party issuers under contract with issuer systems 110. It is further noted that other participants may be involved in some phases of the transaction, such as an intermediary settlement institution.

In various embodiments, each issuer system 110 may comprise a sub-network, computer-based system, software component, and/or the like configured to provide an access point to various systems, engines, and components for a given financial institution, such as a payment network. For example, issuer systems 110 may include systems and databases related to financial and/or transaction systems and processes, such as, for example, one or more authorization engines, authentication engines and databases, settlement engines and databases, accounts receivable systems and databases, accounts payable systems and databases, and/or the like. As a further example, issuer systems 110 may be configured to authorize and settle transactions; maintain transaction account member databases (e.g., including local issuer repository 117-1, 117-2), accounts receivable databases, accounts payable databases, etc.; and/or the like. In various embodiments, issuer systems 110 may also each comprise a credit authorization system ("CAS") capable of authorizing transactions, as discussed further herein. Each issuer systems 110 may be in electronic communication with blockchain network 101, as discussed further herein.

In various embodiments, each issuer system 110 may be configured to generate, store, and update issuer-maintained transaction account data. The issuer maintained transaction account data may comprise an account hash (e.g., a cryptographic hash of various transaction account data), past account hashes (e.g., account hashes from previous transaction account data), a transaction account or transaction account instrument (e.g., physical card) expiration date, a transaction account address (e.g., street address, city, state, zip code, etc.), transaction account contact information (e.g., phone number, email address, etc.), or the like. Each issuer system 110 may comprise hardware and/or software components capable of performing cryptographic operations and generating the account hash. For example, issuer systems 110 may be configured to generate the account hash using select data elements from transaction account data, such as, for example, using one or more of an account holder name (e.g., first name, last name, etc.), a transaction account number, a zip code, a transaction instrument expiration date, and/or the like. Issuer systems 110 may use any suitable hashing algorithm to generate the account hash, such as, for example an encryption algorithm from the SHA-2 series of cryptographic methods (e.g., SHA 256, SHA 512, etc.), and/or any other cryptographic algorithm or technique discussed herein. In various embodiments, generating the account hash may further include implementing techniques to make the account hash more secure against brute-force attacks, rainbow table attacks, and similar security attacks, such as, for example, key stretching techniques, multi-party computation methods (or two-party computation methods), or the like. In various embodiments, the account hash may also be made more secure by using data from issuer system 110 that could not easily be inferred from public data.

In response to issuer system 110-1 or 110-2 changing the transaction account number (e.g., in response to an expiration or account being compromised), updating an expiration date, or canceling the transaction account, the corresponding issuer system 110 may generate an updated account hash based on the changed or updated transaction account data, as discussed further herein.

In various embodiments, each issuer system 110 may be computer based, and may comprise a processor, a tangible non-transitory computer-readable memory, and/or a network interface, along with other suitable system software and hardware components. Instructions stored on the tangible non-transitory memory may allow issuer system 110 to perform various functions, as described herein. In various embodiments, each issuer system 110 may comprise one or more of an issuer software development kit (SDK) 112, an issuer blockchain node 115, and/or a local issuer repository 117. For example, first issuer system 110-1 may comprise a first issuer SDK 112-1, a first issuer blockchain node 115-1, and/or a first local issuer repository 117-1; second issuer system 110-2 may comprise a second issuer SDK 112-2, a second issuer blockchain node 115-2, and/or a second local issuer repository 117-2; and the like.

In various embodiments, each issuer blockchain node 115 may be in electronic communication with one or more other blockchain nodes in blockchain network 101. Each issuer blockchain node 115 may be configured to allow the associated issuer system 110 access to blockchain network 101 and/or maintained accounts blockchain 107. Issuer blockchain nodes 115 may be configured to maintain a copy (or partial copy) of maintained accounts blockchain 107, write to and/or retrieve data and blocks from maintained accounts blockchain 107, validate blocks of maintained accounts blockchain 107, and/or propagate writes to maintained accounts blockchain 107 to blockchain network 101, as discussed further herein. Each issuer blockchain node 115 may communicate with one or more blockchain nodes in blockchain network 101 to validate and write blocks to maintained accounts blockchain 107, and to establish consensus between the blockchain nodes. For example, the blockchain nodes may establish consensus based on proof of work, proof of stake, practical byzantine fault tolerance, delegated proof of stake, or other suitable consensus algorithms.

Each issuer blockchain node 115 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), internet of things (IoT) devices, or any other device capable of receiving data over a network. Each issuer blockchain node 115 may run applications to interact with maintained accounts blockchain 107, communicate with other devices, perform crypto operations, and otherwise operate within issuer system 110. For example, each issuer blockchain node 115 may run a client application that can be a thin client (web), a hybrid (e.g., web and native, such as APPLE® iOS and ANDROID®), or a native application to make application programming interface (API) calls to interact with maintained accounts blockchain 107, such as a web3 API compatible with blockchain databases maintained by ETHEREUM®.

In various embodiments, maintained accounts blockchain 107 may be a distributed ledger that maintains records in a readable manner and that is resistant to tampering. Maintained accounts blockchain 107 may be based on blockchain technologies such as, for example, ETHEREUM®, Open Chain, Chain Open Standard, HYPERLEDGER® Fabric, CORDA CONNECT®, INTEL® Sawtooth, etc. Maintained accounts blockchain 107 may comprise a ledger of interconnected blocks containing data. Each block may link to the previous block and may include a timestamp. Each block may hold one or more account hashes, transaction account data, or the like. When implemented in support of system 100, maintained accounts blockchain 107 may serve as an immutable log of maintained transaction accounts in system 100. maintained accounts blockchain 107 may be maintained on various blockchain nodes (e.g., first issuer blockchain node 115-1, second issuer blockchain node 115-2, first merchant blockchain node 125-1, second merchant blockchain node 125-2, etc.) in blockchain network 101, and may be maintained in the form of copies or partial copies of the maintained accounts blockchain 107, as discussed further herein. Blocks (e.g., including transaction account data, account hashes, etc.) may be written to maintained accounts blockchain 107 by establishing consensus between the blockchain nodes. For example, consensus may be established based on proof of work, proof of stake, practical byzantine fault tolerance, delegated proof of stake, or other suitable consensus algorithms.

A blockchain address may be uniquely assigned to each issuer system 110 to function as a unique identifier in system 100. For example, each issuer system 110 may register with system 100 and/or an existing trust participant (e.g., identity provider), and may be assigned and provided a private key and public key pair. For example, and in accordance with various embodiments, in a permissioned blockchain consortium, each individual participant system will procure a public key and private key pair from a third-party certificate authority (e.g., DIGICERT®, VERISIGN®, etc.). In a blockchain consortium, one of the participant issuer systems 110 may initiate and create the blockchain network and may invite (or receive invitation requests from) one or more of the other participants to join the blockchain consortium. Invited participants may accept the request by transmitting a configuration request to join the blockchain consortium. The configuration request may be validated and/or approved by existing participants of the blockchain consortium using digital signature verification. The private key may be stored with each respective issuer system 110, and as discussed further herein, data can be encrypted with the public key prior to writing to maintained accounts blockchain 107.

In various embodiments, each issuer SDK 112 may comprise one or more software, services, interfaces, application programming interfaces (APIs), software development kits (SDKs), or the like configured to enable communications and transmissions between each issuer system 110 (and/or issuer system 110 subsystems or components) and the corresponding issuer blockchain node 115. For example, each issuer SDK 112 may comprise programmatic libraries configured to translate and transmit queries and commands from each issuer system 110 (e.g., via a user terminal or the like) to the associated issuer blockchain node 115. Issuer SDKs 112 may translate requests received by each issuer blockchain node 115 into a blockchain format (which may include digital signing using system-specific security certificates). For example, each issuer system 110 may be configured to store and maintain one or more system-specific cryptographic keys used to perform cryptographic operations. As a further example, and in accordance with various embodiments, issuer SDKs 112 may be configured to translate data retrieved from maintained accounts blockchain 107 into a format readable by the issuer system 110, which may include digital signature verification and/or data transformation from a blockchain specific data layout to an application specific data layout.

In various embodiments, each local issuer repository 117 may be configured to store and maintain the issuer-specific maintained transaction account data. Each local issuer repository 117 may comprise any suitable database, data structure, list, file, repository, or the like described herein. Local issuer repository 117 may be configured to store and associate account hashes with past account hashes. In that respect, in response to the associated issuer system 110 updating transaction account data and generating a new account hash, local issuer repository 117 may store the new account hash and designate the new account hash as the primary hash (e.g., via a tag, identifier, etc.), and remove the primary hash designation from the stored past account hash.

In various embodiments, system 100 may comprise one or more merchant systems 120. For example, system 100 may comprise a first merchant system 120-1, a second merchant system 120-2, and/or any other number of merchant systems (collectively, merchant systems 120). Each merchant system 120 may be in electronic communication with blockchain network 101, credential issuing authority 130, and/or one or more issuer systems 110. Phrases and terms similar to "merchant system," "merchant," "business," or the like may be used interchangeably with each other and shall mean any person, entity, distributor system, software, and/or hardware that is a provider, broker, and/or any other entity in the distribution chain of goods or services. For example, one or more merchant systems 120 may be associated with a grocery store, a retail store, a travel agency, a service provider, an online merchant, or the like. In various embodiments, merchant system 120 may also be a payment service provider configured to provide connectivity between online merchants and one or more issuer systems 110.

Merchant systems 120 may be configured to interact with various users to complete transactions such as, for example, during the sale of goods and services. Merchant system 120 may be configured to receive and process account on file requests. The account on file request may be received in response to a user desiring to store a transaction account with merchant system 120. For example, the account on file request may be received by merchant system 120 during a user registration process, during a transaction or as part of a checkout process, and the like. The account on file request may comprise user data (e.g., first name, last name, etc.), an issuer identifier (e.g., issuer system 110 that issued the transaction account), and transaction account data, such as, for example a transaction account number, a transaction account address (e.g., street address, city, state, zip code, etc.), a transaction account security code (e.g., a card security code (CSC), a card verification value (CVV), etc.), a transaction account expiration date, and the like. Merchant systems 120 may be configured to store, update, and maintain the merchant-stored transaction account data, as described further herein. Each merchant system 120 may comprise any suitable combination of hardware and/or software, and may comprise one or more of a server, computing device, data structure, or the like.

In various embodiments, each merchant system 120 may be computer based, and may comprise a processor, a tangible non-transitory computer-readable memory, and/or a network interface, along with other suitable system software and hardware components. Instructions stored on the tangible non-transitory memory may allow each merchant system 120 to perform various functions, as described herein. In various embodiments, each merchant system 120 may comprise one or more of a merchant software development kit (SDK) 122, a merchant blockchain node 125, and/or a local merchant repository 127. For example, first merchant system 120-1 may comprise a first merchant SDK 122-1, a first merchant blockchain node 125-1, and/or a first local merchant repository 127-1; second merchant system 120-2 may comprise a second merchant SDK 122-2, a second merchant blockchain node 125-2, and/or a second local merchant repository 127-2; and the like.

In various embodiments, each merchant blockchain node 125 may be in electronic communication with one or more other blockchain nodes in blockchain network 101. Each merchant blockchain node 125 may be configured to allow the associated merchant system 120 access to blockchain network 101 and/or maintained accounts blockchain 107. Merchant blockchain nodes 125 may be configured to maintain a copy (or partial copy) of maintained accounts blockchain 107, write to and/or retrieve data and blocks from maintained accounts blockchain 107, validate blocks of maintained accounts blockchain 107, and/or propagate writes to maintained accounts blockchain 107 to blockchain network 101, as discussed further herein. Each merchant blockchain node 125 may communicate with one or more blockchain nodes in blockchain network 101 to validate and write blocks to maintained accounts blockchain 107, and to establish consensus between the blockchain nodes. For example, the blockchain nodes may establish consensus based on proof of work, proof of stake, practical byzantine fault tolerance, delegated proof of stake, or other suitable consensus algorithms.

Each merchant blockchain node 125 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), internet of things (IoT) devices, or any other device capable of receiving data over a network. Each merchant blockchain node 125 may run applications to interact with maintained accounts blockchain 107, communicate with other devices, perform crypto operations, and otherwise operate within the merchant system 120. For example, each merchant blockchain node 125 may run a client application that can be a thin client (web), a hybrid (e.g., web and native, such as APPLE® iOS and ANDROID®), or a native application to make application programming interface (API) calls to interact with maintained accounts blockchain 107, such as a web3 API compatible with blockchain databases maintained by ETHEREUM®.

In various embodiments, each merchant SDK 122 may comprise one or more software, services, interfaces, application programming interfaces (APIs), software development kits (SDKs), or the like configured to enable communications and transmissions between each merchant system 120 (and/or merchant system 120 subsystems or components) and the corresponding merchant blockchain node 125. For example, each merchant SDK 122 may comprise programmatic libraries configured to translate and transmit queries and commands from each merchant system 120 (e.g., via a user terminal or the like) to the associated merchant blockchain node 125. Merchant SDKs 122 may translate requests received by each merchant blockchain node 125 into a blockchain format (which may include digital signing using system-specific security certificates). For example, each merchant system 120 may be configured to store and maintain one or more system-specific cryptographic keys used to perform cryptographic operations. As a further example, and in accordance with various embodiments, merchant SDKs 122 may be configured to translate data retrieved from maintained accounts blockchain 107 into a format readable by the merchant system 120, which may include digital signature verification and/or data transformation from a blockchain specific data layout to an application specific data layout.

In various embodiments, merchant systems 120 may each include a blockchain oracle configured to generate one or more notifications in response to data being written to maintained accounts blockchain 107. For example, the blockchain oracle may be configured to query the associated merchant blockchain node 125 at a defined interval to search for new writes to maintained accounts blockchain 107. The blockchain oracle may be controlled by notification triggers containing filters indicating the types of data written to maintained accounts blockchain 107 that will generate a notification.

In various embodiments, each local merchant repository 127 may be configured to store and maintain the merchant-stored transaction account data. Each local merchant repository 127 may comprise any suitable database, data structure, list, file, repository, or the like described herein. Local merchant repository 127 may be configured to store and associate account hashes with past account hashes. In that respect, in response to the associated merchant system 120 updating transaction account data, generating a new account hash, or the like, local merchant repository 127 may store the new account hash and designate the new account hash as the primary hash (e.g., via a tag, identifier, etc.), and remove the primary hash designation from the stored past account hash.

In various embodiments, credential issuing authority 130 may be in electronic communication with one or more merchant systems 120 (e.g., first merchant system 120-1, second merchant system 120-2, etc.). Credential issuing authority 130 may comprise any suitable combination of hardware, software, and/or database components. Credential issuing authority 130 may be configured receive requests for merchant credentials from one or more merchant system 120, and issue a merchant credential in return. The merchant credential may comprise a generated ID, certificate, token, or the like configured to identify a valid merchant account without exposing information about the identity of merchant system 120. In that regard, use of the merchant credential may enable merchant systems 120, via merchant blockchain node 125, to write data to maintained accounts blockchain 107 such that a third-party would be unable to detect or trace the identity of the merchant system 120. For example, the merchant credential may be generated by credential issuing authority 130 using zero-knowledge proof protocols and technology, such as, for example, integration of IBM® IDENTITY MIXER. Merchant system 120 may register with credential issuing authority 130 and may request a merchant credential for one or more generated account hashes to be written to maintained accounts blockchain 107. In various embodiments, credential issuing authority 130 may verify each merchant system 120 based on merchant credentials and/or through any other suitable verification method. In various embodiments, credential issuing authority 130 may comprise one or more issuer systems. In various embodiments, credential issuing authority 130 may comprise one or more independent entities configured to issue credentials to merchant systems 120.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form. As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (IW) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Figure 2:
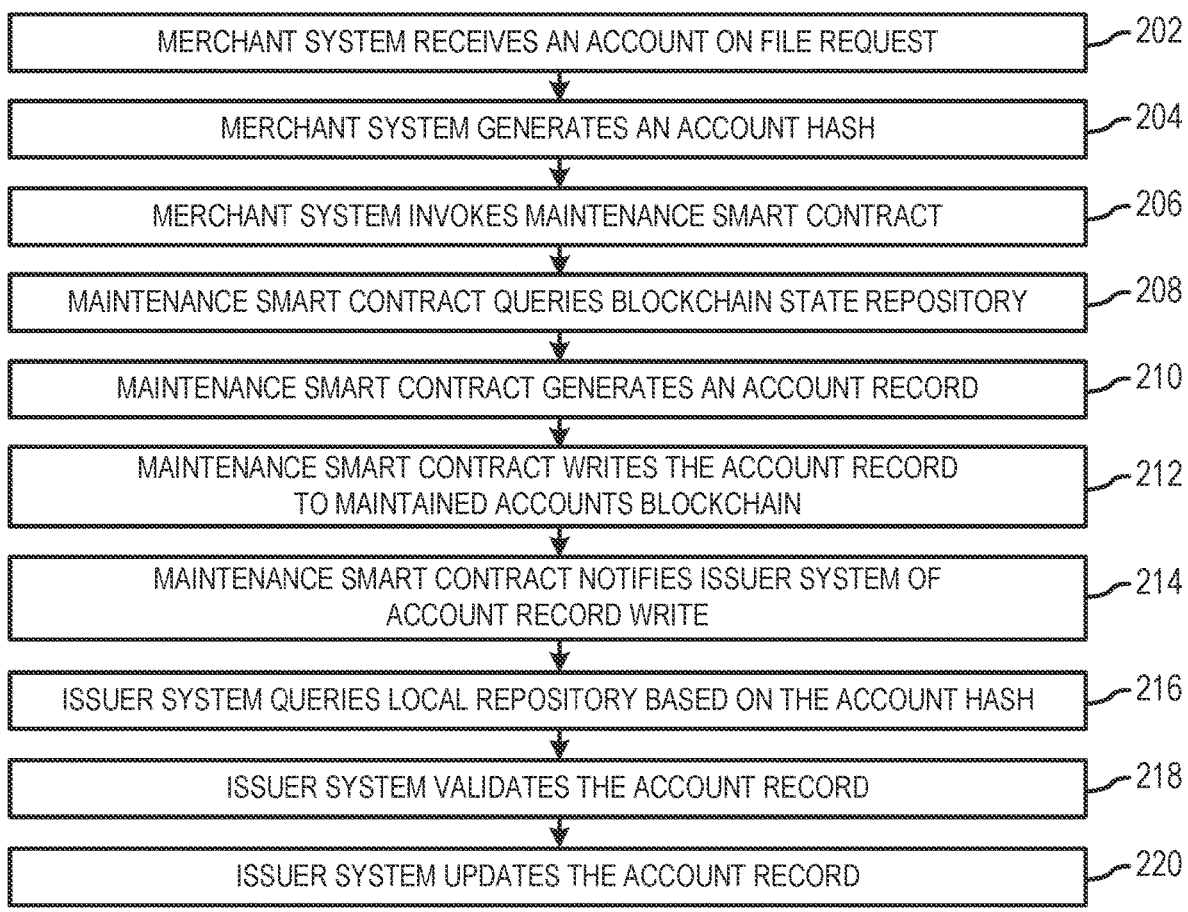
FIG. 2 illustrates a process flow for a method of storing transaction account data by a merchant system, in accordance with various embodiments.
Figure 3:
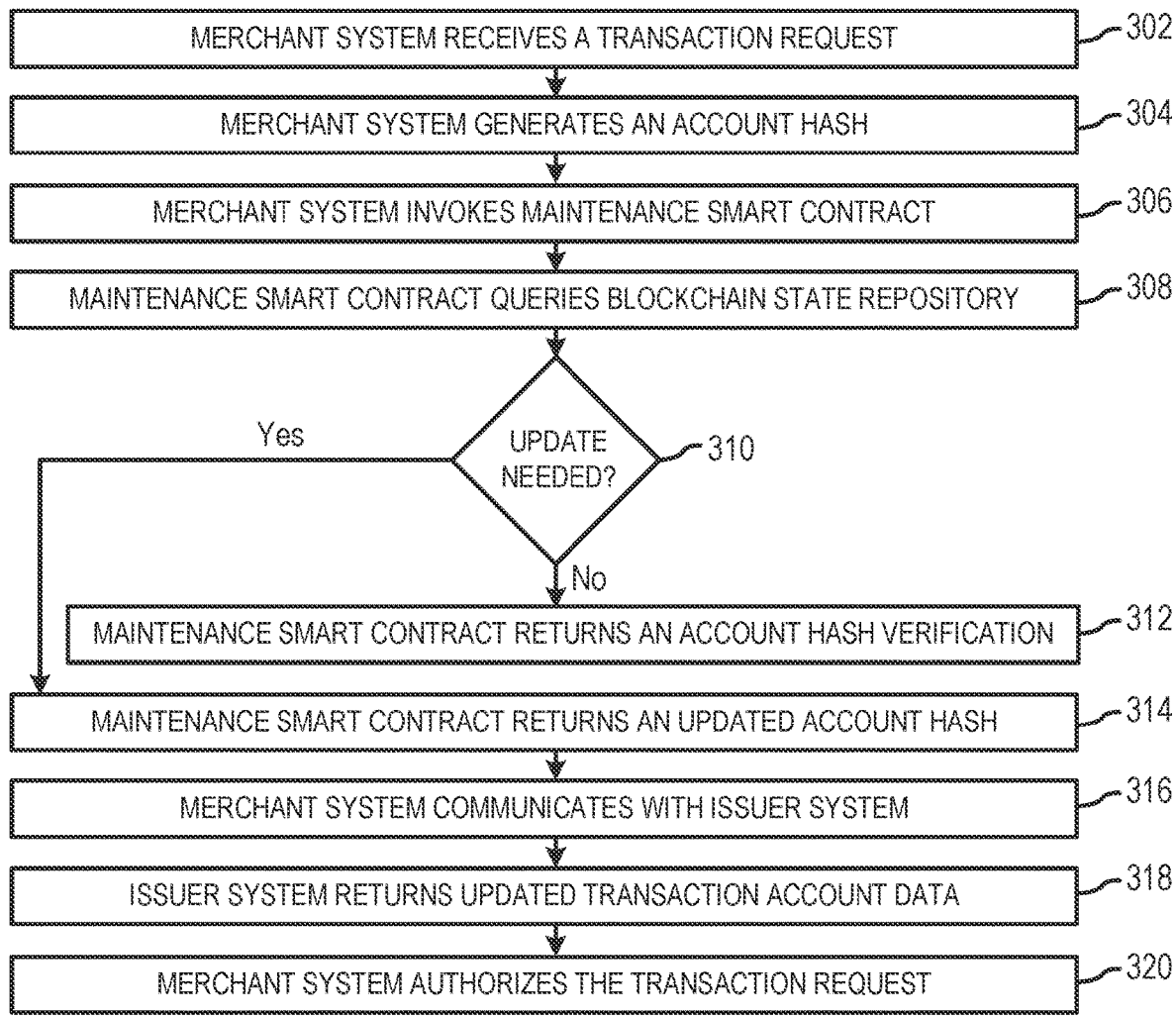
FIG. 3 illustrates a process flow for a method of updating merchant-stored transaction account data, in accordance with various embodiments.
Figure 4:
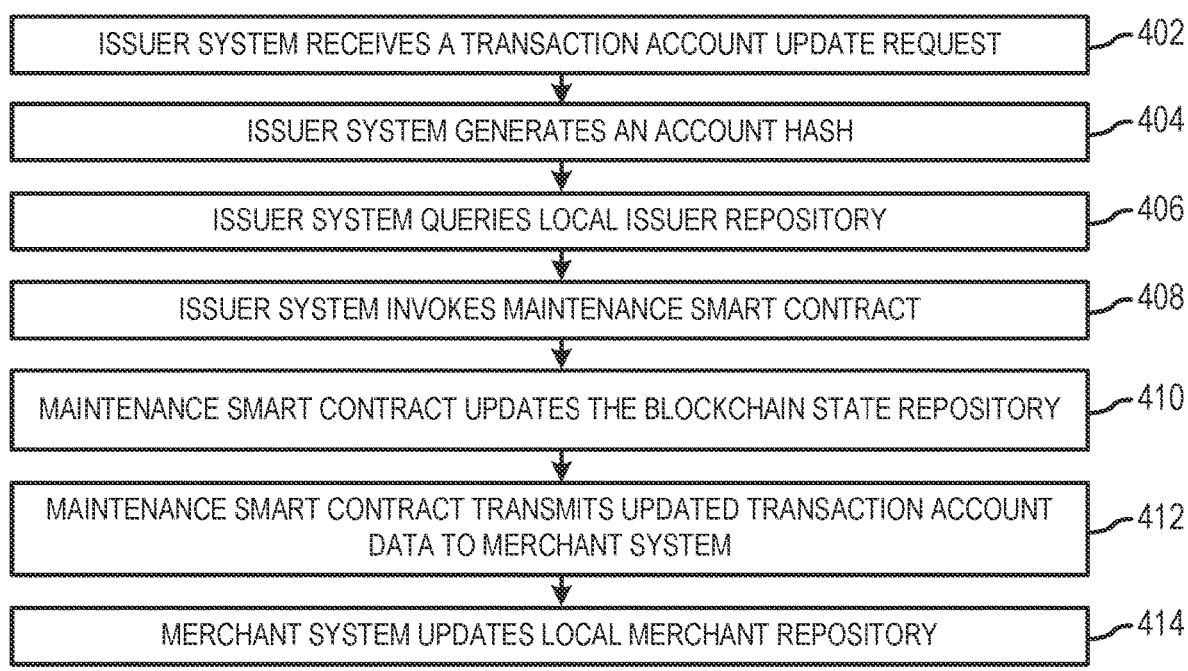
FIG. 4 illustrates a process flow for a method of updating stored transaction account data by an issuer system, in accordance with various embodiments.

Referring now to FIGS. 2-4 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-4, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, and with specific reference to FIG. 2, a method 201 for storing a transaction account by a merchant system is disclosed. Merchant system 120 receives an account on file request (step 202). The account on file request may be received in response to a user desiring to store a transaction account with merchant system 120. For example, the account on file request may be received by merchant system 120 during a user registration process, during a transaction, as part of a checkout process, and/or the like. The account on file request may comprise user data (e.g., first name, last name, etc.), an issuer identifier (e.g., issuer system 110 that issued the transaction account), and transaction account data, such as, for example a transaction account number, a transaction account address (e.g., street address, city, state, zip code, etc.), a transaction account security code (e.g., a card security code (CSC), a card verification value (CVV), etc.), a transaction account expiration date, and the like. In various embodiments, merchant system 120 may store the account on file request in local merchant repository 127.

In various embodiments, merchant system 120 generates an account hash (step 204). Merchant system 120 generates the account hash based on one or more data elements from the account on file request. For example, the account hash may comprise a one-way cryptographic hash of one or more of the user first name, the user last name, the transaction account number, the transaction account address, the transaction account security code, the transaction account expiration date, or the like. Merchant system 120 may strengthen the security of the account hash by using transaction account data from merchant system 120 that could not easily be inferred from public data. Merchant system 120 may generate the account hash using any suitable hashing algorithm, such as an encryption algorithm from the SHA-2 series of cryptographic methods (e.g., SHA 256, SHA 512, etc.), or the like. In various embodiments, generating the account hash may further include implementing techniques to make the account hash more secure against brute-force attacks, rainbow table attacks, and similar security attacks, such as, for example, key stretching techniques, multi-party computation methods (or two-party computation methods), or the like.

In various embodiments, merchant system 120 may also request a merchant credential from credential issuing authority 130. The merchant credential may comprise a generated ID, certificate, token, or the like configured to identify a valid merchant account without exposing information about the identity of merchant system 120. For example, the merchant credential may be generated by credential issuing authority 130 using zero-knowledge proof protocols and technology, such as, for example, integration of IBM® IDENTITY MIXER. Merchant system 120 may register with credential issuing authority 130 and may request a merchant credential to use for one or more generated account hashes to be written to maintained accounts blockchain 107. In various embodiments, credential issuing authority 130 may verify each merchant system 120 during registration based on any suitable verification method, such as, for example, by verifying merchant credentials. As a further example, OAuth 2.0 (or the like) may be implemented by credential issuing authority 130 to sign in the merchant to one of the trusted issuer portals corresponding to an issuer system in system 100.

Merchant system 120 invokes maintenance smart contract 105 (step 206). Merchant system 120, via merchant blockchain node 125, may invoke maintenance smart contract 105 by passing the account hash, the issuer ID, and one or more transaction account data (e.g., the transaction account expiration date, the transaction account address, or the like). In various embodiments, merchant system 120 may also pass the generated merchant credential obtained from credential issuing authority 130 to maintenance smart contract 105. In that respect, the identity of merchant system 120 may be concealed during writes to maintained accounts blockchain 107. In various embodiments, the transaction account data passed to maintenance smart contract 105 may be non-sensitive data (e.g., transaction account security code, etc.) to improve data security in the system. In response to being invoked, maintenance smart contract 105 queries the blockchain state repository (step 208) based on the passed data, such as the account hash and the issuer ID. In response to locating the account hash and the issuer ID in the blockchain state repository, maintenance smart contract 105 may return data indicating that the account hash and issuer ID pre-exist and requesting that merchant system 120 confirm registration (e.g., the account hash and issuer ID were previously registered with maintenance smart contract 105).

In response to being unable to locate the account hash and the issuer ID, maintenance smart contract 105 generates an account record (step 210). The account record may comprise the account hash and the one or more non-sensitive transaction account data, such as the transaction account expiration date and/or the transaction account address (e.g., one or more of the street address, city, state, zip code, etc.). In response to generating the account record, maintenance smart contract 105 writes the account record to maintained accounts blockchain 107 (step 212). Maintenance smart contract 105, via merchant blockchain node 125, may propagate the write to at least a second blockchain node in blockchain network 101 for writing to maintained accounts blockchain 107. Merchant blockchain node 125 and at least the second blockchain node may consent to the write using any suitable method. The blockchain write may be signed by a digital certificate corresponding to the merchant system.

In various embodiments, maintenance smart contract 105 notifies issuer system 110 of the account record write (step 214). The notification may also comprise the account hash and the one or more non-sensitive transaction account data written to maintained accounts blockchain 107. The notification may be transmitted through blockchain network 101 (e.g., via an event interface programmatically provided through blockchain software). In response to receiving the notification, issuer system 110 queries local issuer repository 117 based on the account hash (step 216) from the account record. In various embodiments, issuer system 110 may previously generate and store various account hashes for maintained transaction accounts, including primary account hashes, past account hashes, and the like. In response to locating the account hash, issuer system 110 validates the account record (step 218). Issuer system 110 may validate the account record by determining whether the account hash is the current primary account hash (or a past account hash), and/or whether the one or more non-sensitive transaction account data are up to date (e.g., the transaction account expiration date, the transaction account address, etc.). Issuer system 110 may generate updated account record data that includes the new transaction account data (e.g., the updated transaction account address, transaction account expiration date, etc.) and the issuer ID corresponding to issuer system 110.

Issuer system 110 updates the account record (step 220) previously written to maintained accounts blockchain 107. For example, issuer system 110, via issuer blockchain node 115, may update the account record by invoking maintenance smart contract 105 (e.g., by passing the updated account record data). For example, issuer system 110, via issuer blockchain node 115, invokes maintenance smart contract 105 by passing the updated account record data to maintenance smart contract 105. In response to being invoked, maintenance smart contract 105, via issuer blockchain node 115, may write the updated account record data to maintained accounts blockchain 107, and may associate the updated account record data to the previously written account record. Maintenance smart contract 105, via issuer blockchain node 115, may propagate the write to at least a second blockchain node in blockchain network 101 for writing to maintained accounts blockchain 107. Issuer blockchain node 115 and at least the second blockchain node may consent to the write using any suitable method.

In various embodiments, and with specific reference to FIG. 3, a method 301 for updating a merchant-stored transaction account is disclosed. Merchant system 120 receives a transaction request (step 302). For example, a user may interact with merchant system 120 via a merchant online portal or the like, and may desire to initiate a transaction by purchasing goods or services. The user may be preregistered with merchant system 120 such as, for example, by completing the account on file request of method 201, with brief reference to FIG. 2. The transaction request may comprise transaction data (e.g., transaction amount, shipping details, etc.) and merchant-stored transaction account data. For example, in response to the user initiating the transaction, merchant system 120 may retrieve the merchant-stored transaction account data from local merchant repository 127. The merchant-stored transaction account data may comprise user data (e.g., first name, last name, etc.), an issuer identifier (e.g., issuer system 110 that issued the transaction account), and transaction account data such as, for example, a transaction account number, a transaction account address (e.g., street address, city, state, zip code, etc.), a transaction account security code (e.g., a card security code (CSC), a card verification value (CVV), etc.), a transaction account expiration date, and the like.

Merchant system 120 generates an account hash (step 304). Merchant system 120 generates the account hash based on one or more data elements from the merchant-stored transaction account data. For example, the account hash may comprise a one-way cryptographic hash of one or more of the user first name, the user last name, the transaction account number, the transaction account address, the transaction account security code, the transaction account expiration date, or the like. Merchant system 120 may strengthen the security of the account hash by using transaction account data from merchant system 120 that could not easily be inferred from public data. Merchant system 120 may generate the account hash using any suitable hashing algorithm, such as an encryption algorithm from the SHA-2 series of cryptographic methods (e.g., SHA 256, SHA 512, etc.), or the like. In various embodiments, generating the account hash may further include implementing techniques to make the account hash more secure against brute-force attacks, rainbow table attacks, and similar security attacks, such as, for example, key stretching techniques, multi-party computation methods (or two-party computation methods), or the like.

Merchant system 120 invokes maintenance smart contract 105 (step 306). Merchant system 120, via merchant blockchain node 125, may invoke maintenance smart contract 105 by passing the account hash, the issuer ID, and one or more transaction account data (e.g., the transaction account expiration date, the transaction account address, or the like). In various embodiments, merchant system 120 may also pass a generated merchant credential obtained from credential issuing authority 130 to maintenance smart contract 105. In that respect, the identity of merchant system 120 may be concealed during writes to maintained accounts blockchain 107. In various embodiments, the transaction account data passed to maintenance smart contract 105 may be non-sensitive data (e.g., transaction account security code, etc.) to improve data security in the system.

In various embodiments, maintenance smart contract 105 queries blockchain state repository (step 308) based on the account hash. Maintenance smart contract 105 may query the blockchain state repository to determine whether the account hash exists as a primary account hash or a past account hash. In response to locating the account hash as a primary account hash, the merchant-stored transaction account data may not need any updating. In response to locating the account hash as a past account hash, the merchant-stored transaction account data may need to be updated.

In various embodiments, in response to maintenance smart contract 105 determining that an update to the stored transaction account data is not needed (step 310), maintenance smart contract 105 returns an account hash verification (step 312). The account hash verification may comprise data indicating that the merchant-stored transaction account data is currently up to date. In that regard, in response to receiving the account hash verification, merchant system 120 may continue with processing and completing the transaction.

In various embodiments, in response to maintenance smart contract 105 determining that an update to the stored transaction account data is needed (step 310), maintenance smart contract 105 returns an updated account hash (step 314). The updated account hash may comprise the primary account hash corresponding to the past account hash located by maintenance smart contract 105.

Merchant system 120 communicates with issuer system 110 (step 316). For example, and in accordance with various embodiments, merchant system 120 may invoke a private smart contract to establish communications with issuer system 110. The private smart contract may be specific to, and visible to, only merchant system 120 and issuer system 110 to enable private communications between the parties. Merchant system 120 may invoke the private smart contract by passing the updated account hash, the (generated) account hash, and one or more of the merchant-stored transaction account data. The private smart contract may prompt issuer system 110 by passing by passing the updated account hash, the (generated) account hash, and one or more of the merchant-stored transaction account data to issuer system 110. As a further example, and in accordance with various embodiments, merchant system 120 may also make an API call to establish communications with issuer system 110. Merchant system 120 may make the API call by passing the updated account hash, the (generated) account hash, and one or more of the merchant-stored transaction account data.

In response to being prompted by the private smart contract, receiving the API call, or the like, issuer system 110 may query local issuer repository 117 to locate the transaction account data corresponding to the updated account hash. For example, issuer system 110 may query local issuer repository 117 based on the updated account hash and/or the (generated) account hash to determine transaction account data associated with the respective updated account hash or (generated account hash). In that regard, issuer system 110 may locate the transaction account data that is out of date in the merchant-stored transaction account data, such as, for example, the transaction account number, the transaction account address, the transaction account expiration date, the transaction account security code, or the like. Issuer system 110 returns updated transaction account data (step 318) to merchant system 120. For example, and in accordance with various embodiments, in response to merchant system 120 invoking the private smart contract to transmit the data, issuer system 110 may invoke the private smart contract by passing the updated account hash and the updated transaction account data. In response to receiving the updated transaction account data, merchant system 120 may update the merchant-stored transaction account data to comprise the updated account hash and the updated transaction account data. Merchant system 120 authorizes the transaction request (step 320) and proceeds with processing the transaction. Merchant system 120 may proceed with processing and authorizing the transaction using any suitable process.

In various embodiments, and with specific reference to FIG. 4, a method 401 for updating stored transaction account data by an issuer system is disclosed. Issuer system 110 receives a transaction account update request (step 402). The transaction account update request may be received in response to issuer-stored transaction account data being updated such as, for example, in response to a transaction account being canceled or renewed, to a transaction account being compromised, or the like. The transaction account update request may comprise data identifying the transaction account together with the data to be updated in the transaction account.

In response to receiving the transaction account update request, issuer system 110 generates an account hash (step 404). Issuer system 110 may generate the account hash based on one or more data elements from the transaction account update request. For example, the account hash may comprise a one-way cryptographic hash of one or more of the user first name, the user last name, the transaction account number, the transaction account address, the transaction account security code, the transaction account expiration date, or the like. Issuer system 110 may strengthen the security of the account hash by using transaction account data from merchant system 120 that could not easily be inferred from public data. Issuer system 110 may generate the account hash using any suitable hashing algorithm, such as an encryption algorithm from the SHA-2 series of cryptographic methods (e.g., SHA 256, SHA 512, etc.), or the like. In various embodiments, generating the account hash may further include implementing techniques to make the account hash more secure against brute-force attacks, rainbow table attacks, and similar security attacks, such as, for example, key stretching techniques, multi-party computation methods (or two-party computation methods), or the like.

Issuer system 110 queries local issuer repository 117 (step 406) based on the transaction account update request. For example, issuer system 110 may query local issuer repository based on the transaction account number to locate the data record corresponding to the transaction account update request. Issuer system 110 may update the data record to comprise the updated transaction account data and the (new) account hash. In that regard, issuer system 110 may designate the (new) account hash as the primary account hash, and may change the designation on the previously stored account hash to be a past account hash.

In various embodiments, issuer system 110 invokes maintenance smart contract 105 (step 408). Issuer system 110, via issuer blockchain node 115, may invoke maintenance smart contract 105 by passing the primary account hash, the past account hash, the issuer ID, and/or the updated transaction account data. In response being invoked, maintenance smart contract 105 queries the blockchain state repository based on the passed data, such as the past account hash and the issuer ID. In response to locating the account hash and the issuer ID in the blockchain state repository, maintenance smart contract 105 updates the blockchain state repository (step 410). For example, maintenance smart contract 105 may update the stored account hash to be a past account hash and may write the primary account hash and the updated transaction account data to the blockchain state repository.

Maintenance smart contract 105 transmits transaction account update data to merchant system 120 (step 412). Merchant system 120 updates local merchant repository 127 (step 414). For example, merchant system 120 may query local merchant repository 127 based on the past account hash. Merchant system 120 may update the merchant-stored account hash to be a past account hash, and may write the primary account hash and the updated transaction account data to local merchant repository 127.

In various embodiments, in response to the updated transaction account data being sensitive data (e.g., a transaction account number, etc.), the updated transaction account data may be transmitted to merchant system 120 via a private channel. For example, enterprise blockchain software may provide private channels (e.g., side channels). Blockchain network 101 may provide one or more private channels, and communications in the private channel may be peer-to-peer and may not be broadcast to the other participants in system 100. Data transmitted in the private channel, and the transmission itself, may be encrypted and only visible to the communicating parties.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The phrases "user," "transaction account holder," "transaction account beneficiary," "transaction account affiliate," "consumer," "customer," "cardmember," or the like shall include any person, entity, business, government organization, business, software, hardware, or machine associated with a transaction account, who buys merchant offerings offered by one or more merchants using the transaction account, and/or who is legally designated for performing transactions on the transaction account, regardless of whether a physical card is associated with the transaction account. For example, the user may include a transaction account owner, a transaction account user, an account affiliate, a child account user, a subsidiary account user, a beneficiary of an account, a custodian of an account, and/or any other person or entity affiliated or associated with the transaction account.

Phrases and terms similar to "transaction account," "account number," "account code", or "consumer account" as used herein, may include any device, code (e.g., one or more of an authorization/access code, personal identification number ("PIN"), internet code, other identification code, and/or the like), number, letter, symbol, digital certificate, smart chip, digital signal, analog signal, biometric, or other identifier/indicia suitably configured to allow the consumer to access, interact with or communicate with the system. The transaction account number may optionally be located on or associated with a rewards account, charge account, credit account, debit account, prepaid account, telephone card, embossed card, smart card, magnetic stripe card, bar code card, transponder, radio frequency card, or an associated account.

The transaction account number may be distributed and stored in any form of plastic, electronic, magnetic, radio frequency, wireless, audio, and/or optical device capable of transmitting or downloading data from itself to a second device. The transaction account number may be, for example, a sixteen-digit account number, although each transaction account issuer has its own numbering system, such as the fifteen-digit numbering system used by the AMERICAN EXPRESS® company. In that respect, each of the transaction account issuer's transaction account numbers may comply with that transaction account issuer's standardized format, such that the transaction account issuer using a fifteen-digit format will generally use three-spaced sets of numbers, as represented by the number "0000 000000 00000." The first five to seven digits may be reserved for processing purposes and identify the transaction account issuer, account type, etc. In this example, the last (fifteenth) digit is used as a sum check for the fifteen-digit number, and the intermediary eight-to-eleven digits are used to uniquely identify the user. A merchant identifier may be, for example, any number or alpha-numeric characters that identify a particular merchant for purposes of account acceptance, account reconciliation, reporting, or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random-access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system. The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO®, SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer based systems or the like may communicate with the server via a web client. The web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPE"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method, comprising:
   receiving, by at least one computing device, an account registration request from a client device associated with a user, the account registration request comprising transaction account data of a transaction account of the user and an issuer identifier associated with an issuer system, and the transaction account being provided by the issuer system;
   requesting, by the at least one computing device, a credential from a credential issuing authority;
   obtaining, by the at least one computing device, the credential from the credential issuing authority in response to the credential issuing authority verifying an entity associated with the at least one computing device;
   generating, by the at least one computing device, a registration account hash based at least in part on the transaction account data;
   generating, by the at least one computing device, an account record by invoking a maintenance smart contract, the maintenance smart contract being invoked by passing the registration account hash, one or more transaction account data, the issuer identifier, and the credential in a call to the maintenance smart contract;
   writing, by the at least one computing device and via the maintenance smart contract, the account record to a distributed ledger, an identity of the entity associated with the at least one computing device being concealed based at least in part on the credential;
   notifying, by the at least one computing device and via the maintenance smart contract, the issuer system associated with the transaction account that the account record has been written to the distributed ledger, the issuer system being configured to update the account record and associate the account record with an updated account hash in response to an update to the transaction account by the issuer system;
   generating, by the at least one computing device, a transaction request account hash based at least in part on stored transaction account data in response to receiving a transaction request;
   updating, by the at least one computing device, the stored transaction account data based at least in part on updated transaction account data received from the issuer system in response to the transaction request account hash matching a past account hash and failing to match a primary account hash; and
   authorizing, by the at least one computing device, the transaction request based at least in part on the updated transaction account data included in the account record.

2. The method of claim 1, further comprising invoking the maintenance smart contract by passing the registration account hash and at least one data element from the transaction account data to the maintenance smart contract.

3. The method of claim 1, further comprising determining, by the at least one computing device and via the maintenance smart contract, that the registration account hash fails to be included on the distributed ledger.

4. The method of claim 1, wherein the registration account hash is further generated based at least in part on the issuer identifier associated with the issuer system.

5. The method of claim 1, wherein the transaction account data comprises at least one of a user first name, a user last name, a transaction account number, a transaction account address, a transaction account security code, or a transaction account expiration date.

6. The method of claim 1, further comprising:
   receiving, by the at least one computing device, the transaction request comprising transaction data.

7. The method of claim 1, further comprising:
   receiving, by the at least one computing device, the stored transaction account data stored in a repository in response to receiving the transaction request;
   determining, by the at least one computing device, that the distributed ledger comprises the primary account hash and the past account hash; and
   determining, by the at least one computing device that the transaction request account hash matches the past account hash.

8. A system, comprising:
   a computing device comprising a processor and a memory; and
   machine-readable instructions stored in the memory, that when executed by the processor, cause the computing device to at least:
      receive an account registration request from a client device associated with a user, the account registration request comprising transaction account data of a transaction account of the user and an issuer identifier associated with an issuer system, and the transaction account being provided by the issuer system;
      request a credential from a credential issuing authority;
      obtain the credential from the credential issuing authority in response to the credential issuing authority verifying an entity associated with the at least one computing device;
      generate a registration account hash based at least in part on the transaction account data;

generate an account record by invoking a maintenance smart contract, the maintenance smart contract being invoked by passing the registration account hash, one or more transaction account data, the issuer identifier, and the credential in a call to the maintenance smart contract;

write, via the maintenance smart contract, the account record to a distributed ledger, an identity of the entity associated with the computing device being concealed based at least in part on the credential;

notify, via the maintenance smart contract, the issuer system associated with the transaction account that the account record has been written to the distributed ledger, the issuer system being configured to update the account record and associate the account record with an updated account hash in response to an update to the transaction account by the issuer system;

generate a transaction request account hash based at least in part on stored transaction account data in response to receiving a transaction request;

update the stored transaction account data based at least in part on updated transaction account data received from the issuer system in response to the transaction request account hash matching a past account hash and failing to match a primary account hash; and authorize the transaction request based at least in part on the updated transaction account data included in the account record.

9. The system of claim 8, wherein, when executed, the machine-readable instructions cause the computing device to at least invoke the maintenance smart contract by passing the registration account hash and at least one data element from the transaction account data to the maintenance smart contract.

10. The system of claim 8, wherein, when executed, the machine-readable instructions cause the computing device to at least determine, via the maintenance smart contract, that the registration account hash fails to be included on the distributed ledger.

11. The system of claim 8, wherein the registration account hash is further generated based at least in part on the issuer identifier associated with the issuer system.

12. The system of claim 8, wherein the transaction account data comprises at least one of a user first name, a user last name, a transaction account number, a transaction account address, a transaction account security code, or a transaction account expiration date.

13. The system of claim 8, wherein, when executed, the machine-readable instructions cause the computing device to at least:
receive a transaction request comprising transaction data.

14. The system of claim 8, wherein, when executed, the machine-readable instructions cause the computing device to at least:
receive the stored transaction account data stored in a repository in response to receiving the transaction request;
determine that the distributed ledger comprises the primary account hash and the past account hash; and
determine that the transaction request account hash matches the past account hash.

15. A non-transitory computer-readable medium, comprising machine-readable instructions that, when executed by a processor of a computing device, cause the computing device to at least:

receive an account registration request from a client device associated with a user, the account registration request comprising transaction account data of a transaction account of the user and an issuer identifier associated with an issuer system, and the transaction account being provided by the issuer system;

request a credential from a credential issuing authority;

obtain the credential from the credential issuing authority in response to the credential issuing authority verifying an entity associated with the at least one computing device;

generate a registration account hash based at least in part on the transaction account data;

generate an account record by invoking a maintenance smart contract, the maintenance smart contract being invoked by passing the registration account hash, one or more transaction account data, the issuer identifier, and the credential in a call to the maintenance smart contract;

write, via the maintenance smart contract, the account record to a distributed ledger, an identity of the entity associated with the computing device being concealed based at least in part on the credential;

notify, via the maintenance smart contract, the issuer system associated with the transaction account that the account record has been written to the distributed ledger, the issuer system being configured to update the account record and associate the account record with an updated account hash in response to an update to the transaction account by the issuer system;

generate a transaction request account hash based at least in part on stored transaction account data in response to receiving a transaction request;

update the stored transaction account data based at least in part on updated transaction account data received from the issuer system in response to the transaction request account hash matching a past account hash and failing to match a primary account hash; and authorize the transaction request based at least in part on the updated transaction account data included in the account record.

16. The non-transitory computer-readable medium of claim 15, wherein, when executed, the machine-readable instructions further cause the computing device to at least invoke the maintenance smart contract by passing the registration account hash and at least one data element from the transaction account data to the maintenance smart contract.

17. The non-transitory computer-readable medium of claim 15, wherein, when executed, the machine-readable instructions further cause the computing device to at least determine via the maintenance smart contract that the registration account hash fails to be included on the distributed ledger.

18. The non-transitory computer-readable medium of claim 15, wherein the transaction account data comprises at least one of a user first name, a user last name, a transaction account number, a transaction account address, a transaction account security code, or a transaction account expiration date.

19. The non-transitory computer-readable medium of claim 15, wherein, when executed, the machine-readable instructions further cause the computing device to at least:
receive the transaction request comprising transaction data.

20. The non-transitory computer-readable medium of claim 15, wherein, when executed, the machine-readable instructions further cause the computing device to at least:

receive the stored transaction account data stored in a repository in response to receiving the transaction request;
determine that the distributed ledger comprises the primary account hash and the past account hash; and
determine that the transaction request account hash matches the past account hash.

\* \* \* \* \*